United States Patent [19]

Ozaki et al.

[11] Patent Number: 5,559,644
[45] Date of Patent: Sep. 24, 1996

[54] DATA RECORDING/REPRODUCING APPARATUS HAVING A FIRST ERROR CORRECTING CODE ON BOTH SIDES OF A MAIN DATA AREA OF EACH AZIMUTH TRACK

[75] Inventors: Shinya Ozaki; Hideki Nonoyama, both of Kanagawa, Japan

[73] Assignee: Sony Corporation, Tokyo, Japan

[21] Appl. No.: 399,636

[22] Filed: Mar. 7, 1995

[30] Foreign Application Priority Data

Mar. 15, 1994 [JP] Japan ................................. 6-043749

[51] Int. Cl.⁶ ....................................... G11B 5/09
[52] U.S. Cl. ................................. 360/48; 360/53
[58] Field of Search ............................ 360/32, 48, 53

[56] References Cited

U.S. PATENT DOCUMENTS 5,274,508  12/1993  Tan et al. ............................ 360/48
5,381,274  1/1995  Ueda .................................. 360/48

*Primary Examiner*—W. Chris Kim
*Attorney, Agent, or Firm*—Jay H. Maioli

[57] ABSTRACT

A data recording method and apparatus with reduced probability of error occurrence in main data. For recording data on azimuth tracks on a magnetic tape by a rotary magnetic head, each azimuth track is divided into a main data area and margin areas on both sides of the main data area. The main data recorded in the main data area of each track is arrayed two-dimensionally. An error correction code C2 is appended to a data string arrayed in the track direction, while an error correction code C1 is appended to a data string arrayed along the track width. The error correction code C2 is divided into two portions which are arrayed on both sides of the main data area of each track. This reduces the probability of error occurrence in the main data.

14 Claims, 10 Drawing Sheets

DATA RECORDING/REPRODUCING APPARATUS HAVING A FIRST ERROR CORRECTING CODE ON BOTH SIDES OF A MAIN DATA AREA OF EACH AZIMUTH TRACK

BACKGROUND OF THE INVENTION

This invention relates to a data recording method and a data recording apparatus for recording data transmitted from, e.g., a computer on an azimuth track on a magnetic tape by a rotary head.

In a computer, it has been a practice to transfer data written on, e.g., a hard disc to a data recorder known as data streamer, e.g., once a day for recording the data thereon for protection.

As such data recorder, a commonplace analog audio tape recorder has frequently been employed. Nevertheless, with such analog audio tape recorder, not only is the consumption of the magnetic tape increased, but also data recording and transfer takes a significant time because of the low data transfer rate during recording. In addition, since high speed search is not possible with the analog audio tape recorder, the so-called locating, that is, searching for the leading end portion of desired data, is also time-consuming.

Thus it has been a practice to employ a helical scan digital audio tape recorder, or so-called DAT, employing a rotary head, as the data recorder.

When the DAT is employed as the data recorder, data from a host computer is converted into DAT format data before being recorded. With the DAT format, two azimuth tracks $T_A$, $T_B$, produced with one complete revolution of two heads having different azimuth angles, make up a frame, and 16-bit PCM audio data are recorded by employing the interleaving technique, with the frame as a unit, as shown in FIG. 1. Each track is constituted by 196 blocks, each block being made up of 36 bytes. Both 34 end blocks make up a sub-area and central 128 blocks make up a main area.

Looking from a track end, each sub-area is divided into a margin domain, a sub-code PLL preamble domain, a first sub-code domain, a post-amble domain, adjacent block-to-block gap domain, automatic track finding (ATF) signal domain, adjacent block-to-block gap domain, data PLL preamble domain, adjacent block-to-block gap domain, ATF signal domain, adjacent block-to-block gap domain, sub-code PLL preamble domain, second sub-code domain, post-amble domain, adjacent block-to-block gap domain and a margin domain. The first and second sub-code domains are each constituted by eight blocks, while the remaining domains are constituted by respective predetermined numbers of blocks.

The main area is made up of 128 data blocks. Each data block is made up of a synchronization signal, a PCM-ID, a block address, and a parity, each of a one byte, and 32-byte main data domain, as shown in FIG. 2.

If the main data are audio signals, the main data are 16-bit L-channel PCM audio data and 16-bit R-channel PCM audio data. The 16-bit PCM audio data is arrayed in the main area of a frame, that is, two tracks, along with the parity Q data, by employing the interleaving technique, as shown in FIG. 3. In this case, approximately 5760 bytes of data are recorded in the 1-frame main area.

Thus, with the DAT format, post-recording may be made, using the sub-area, by dividing each track into the main area and the sub-area.

The error correction code for the main data in the DAT format is the two-dimensional code, as shown in FIG. 4. The code has four code planes per track, each being coded in the C1 and C2 directions.

If the DAT is used as a data recorder, data transmitted from the host computer are 16-bit data and handled in the same manner as the PCM audio data. These data are formatted and recorded in the 1-frame main area. Two 16-bit data for the L and R channels are used, in which the upper four bits are format ID data and the lower eight bits are recorded as the logical frame number. The format ID indicates the format proper to the data recorder and the frame numbers of from 1 to 23 are appended for each unit of the logical frame number, such as 23 frames.

As the format of the data recorder employing the DAT, the European Computer Manufacturers Association (ECMA) provides DDS and DDS2 formats.

The DDS or DDS2 formats provide a device area from the physical beginning of tape (PBOT) and logical beginning of tape (LBOT) in the leading region consecutive to the leader tape as the areas for magnetic tape loading and unloading. The device area is followed by a reference area and a system area. The reference area is used as a physical reference when recording a system log in the system area. The system area is followed by the data area for recording data, which in turn is followed by an end-of-data (EOD) area.

The DDS2 format provides two partition tapes P1 and P2, each having the reference area, system area, data area and the EOD area. The system log (hysteresis information) for each of the partitions P1 and P2 is recorded in the system area of each of the partitions P1 and P2.

With the above DAT format, the C2 parity (Q) is arrayed at the center and even-numbered and odd-numbered samples are arrayed on both sides of the C2 (Q) parity, in order that, for error data interpolation, the odd-numbered and the even-numbered samples will be arrayed at the positions furthest from each other on the tape. However, this is not only meaningless with the DDS or DDS2 format which are not in need of interpolation, but also presents a problem that the portions of the tape-shaped recording medium corresponding to the start and end of sliding contact of the recording medium with the rotary head, that is, both terminal portions of the tape in the track direction, tend to be worn by repeated use, thus increasing the probability of data error generation in these portions.

SUMMARY OF THE INVENTION

It is therefore an object of the present invention to provide a data recording method for recording data on an azimuth track on a magnetic tape by a rotary head, in which the probability of occurrence of data errors in the main data is diminished.

It is another object of the present invention to provide a data recording method for recording data on an azimuth track on a magnetic tape by a rotary head, in which error correction may be made for each of a plurality blocks into which each track is divided for improving block-based data reliability.

It is a further object of the present invention to provide a data recording apparatus for recording data on an azimuth track on a magnetic tape by a rotary head, in which the probability of occurrence of data errors in the main data is diminished.

It is a further object of the present invention to provide a data recording apparatus for recording data on an azimuth track on a magnetic tape by a rotary head, in which error correction may be made for each of a plurality blocks into which each track is divided for improving block-based data reliability.

In one aspect, the present invention provides a method for recording data on a plurality of azimuth tracks formed on a tape-shaped recording medium. The method includes the steps of dividing each azimuth track into a main data area and a pair of margin areas on both sides of the main data area, arraying main data recorded in the main data area of each azimuth track, appending a first parity for error detection and correction to a data string arrayed in the track direction, appending a second parity for error detection and correction to a data string arrayed in a direction normal to the track direction, and recording said first parity by a rotary head so that the first parity is arrayed on both sides of the main data area of each azimuth track.

With the reseeding method of the present invention, the main data area may be separated from the portions of the tape-shaped recording medium corresponding to the start and end of sliding contact of the recording medium with the rotary head in order to make the data in the main data area less vulnerable to destruction. In addition, the probability of error occurrence in the main data may be lowered so as to enable the main data to be reliably corrected for errors by the second parity for a data string in the direction normal to the track direction.

In another aspect, the present invention provides a tape-shaped recording medium for recording digital data including a plurality of tracks each having a main data area and a pair of margin areas arrayed on both sides of the main data area. The recording medium stores the digital data comprised of main data, a first parity generated on the basis of a first data set consisting in the main data, and a second parity generated on the basis of a second data set consisting in the main data and the first parity arrayed at the front and rear sides of the main data. The first parity is arrayed at the front and rear sides of the main data, and the second parity is arrayed at the rear side of the data set consisting in the main data to which the first parity has been appended.

In a further aspect, the present invention provides a data recording apparatus for a tape-shaped recording medium in which data is recorded by a rotary head on a plurality of azimuth tracks formed on a tape-shaped recording medium. The apparatus includes an interface controller for data exchange with the outside; and first and second parity generating means for appending a first parity and a second parity for error detection and correction to main data supplied via the interface controller. Each azimuth track is divided into a main data area and a pair of margin areas on both sides of said main data area. The main data recorded in the main data area of each track is arrayed two-dimensionally. A first parity for error detection and correction from the first parity generating means is appended to a data string arrayed in the track direction, and a second parity for error detection and correction from the second parity generating means is appended to a data string arrayed in a direction normal to the track direction. The first parity is arrayed on both sides of the main data area of each track. The resulting data is recorded by a rotary head on the tape-shaped recording medium.

With the recording method of the present invention, each one track portion of the main data is divided into plurality blocks, for each of which a further parity for error detection and correction is appended, and the further parity is recorded in the main data area along with the further parity. Thus the main data on the block basis may be improved in reliability.

In a further aspect, the present invention provides a data recording/reproducing apparatus for a tape-shaped recording medium having a plurality of azimuth tracks. The apparatus includes an interface controller for data exchange with the outside and first and second parity generating means for appending a first parity and a second parity for error detection and correction to a main data supplied via the interface controller. The first parity generating means generates the first parity based upon a data set consisting in main data recorded in a main data area of the tape-shaped recording medium each track of which is divided into the main data area and a pair of margin areas arrayed on both sides of :said main data area. The second parity generating means generates the second parity based upon a data set consisting in the first parity and the main data recorded in the main data area in each track. The apparatus also includes recording/reproducing means for recording the first parity generated by the first parity generating means so that the first parity is appended at the front and rear sides of the main data, and for recording the second parity generated by the second parity generating means so that the second parity is appended to the main data to which the first parity has been appended. The recording/reproducing means reads out data recorded in the main data area of each track of the tape-shaped recording medium. The apparatus also includes first decoding means for effecting error correction and detection based upon the second parity in the data read out by the recording/reproducing means, and second decoding means for effecting error correction and detection based upon the first parity in data decoded by the first decoding means. The decoded data from the second decoding means is fed to the interface controller.

In yet another aspect, the present invention provides a data reproducing apparatus for a tape-shaped recording medium on which digital data is recorded, in which the tape-shaped recording medium has a plurality of tracks each divided into a main data area and a pair of margin areas arrayed on both sides of the main data area, a first parity is generated based upon a first data set consisting in main data recorded in the main data area of each track, which first parity is arrayed at front and rear sides of the main data, and in which a second parity is generated based upon a second data set consisting in the main data and the first parity recorded in the main data area in each track, which second parity is arrayed at the rear side of the main data to which the first parity has been appended. The apparatus includes recording/reproducing means for reading out data recorded in the main data area of each track of the tape-shaped recording medium, first decoding means for effecting error detection and correction based upon the second parity in data read out from the recording/reproducing means, second decoding means for effecting error detection and correction based upon the first parity in decoded data from the first decoding means, and an interface controller supplied with decoded data from said second decoding means.

DESCRIPTION OF THE PREFERRED EMBODIMENTS

Figure 1:
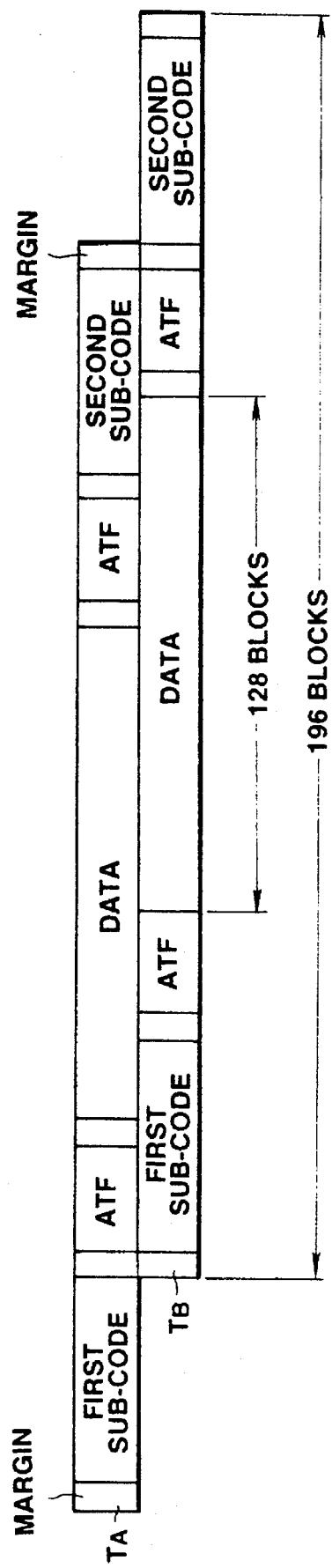
FIG. 1 is a diagrammatic view showing a DAT format.
Figure 2:
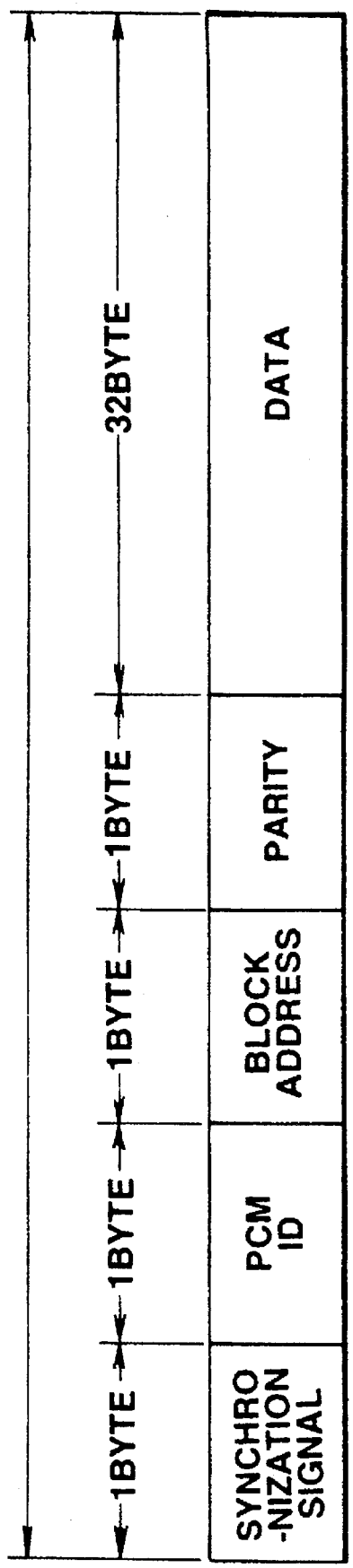
FIG. 2 is a diagrammatic view showing the block format of main data in the DAT format.
Figure 3:
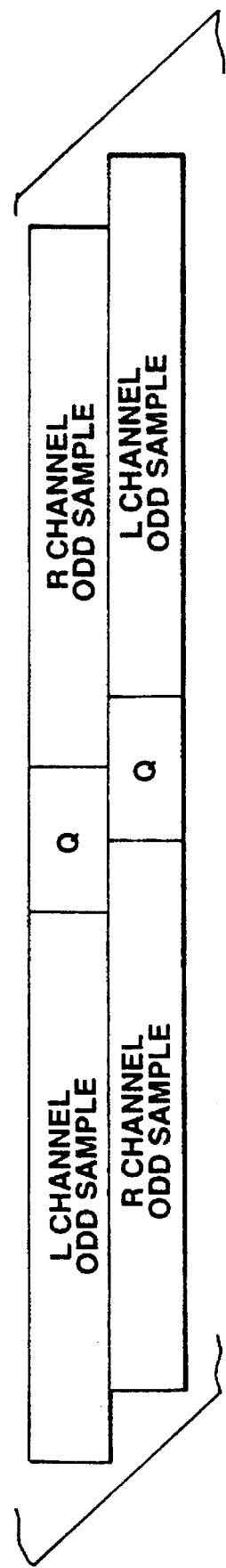
FIG. 3 is a diagrammatic view showing a data array on data interleaving with the DAT format.
Figure 4:
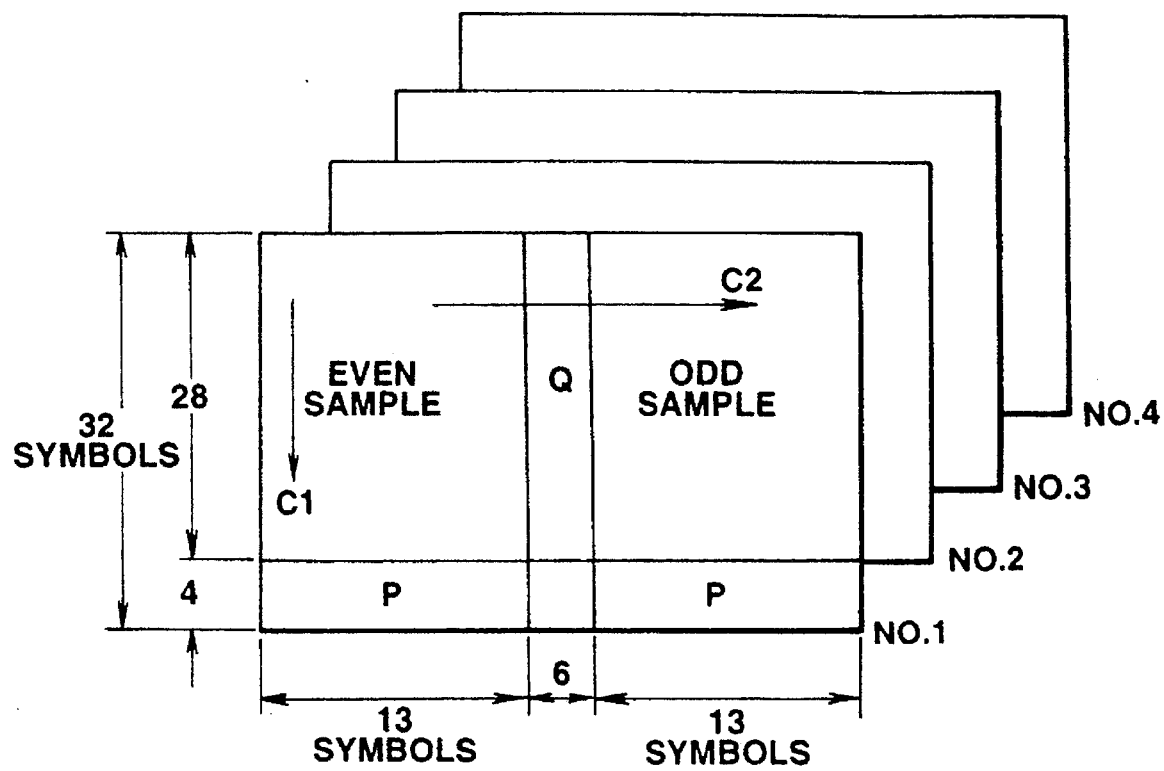
FIG. 4 is a diagrammatic view showing the constitution of an error correction code for main data in the DAT format.

Referring to the drawings, preferred embodiments of the data recording method and apparatus according to the present invention will be explained in detail.

Figure 5:
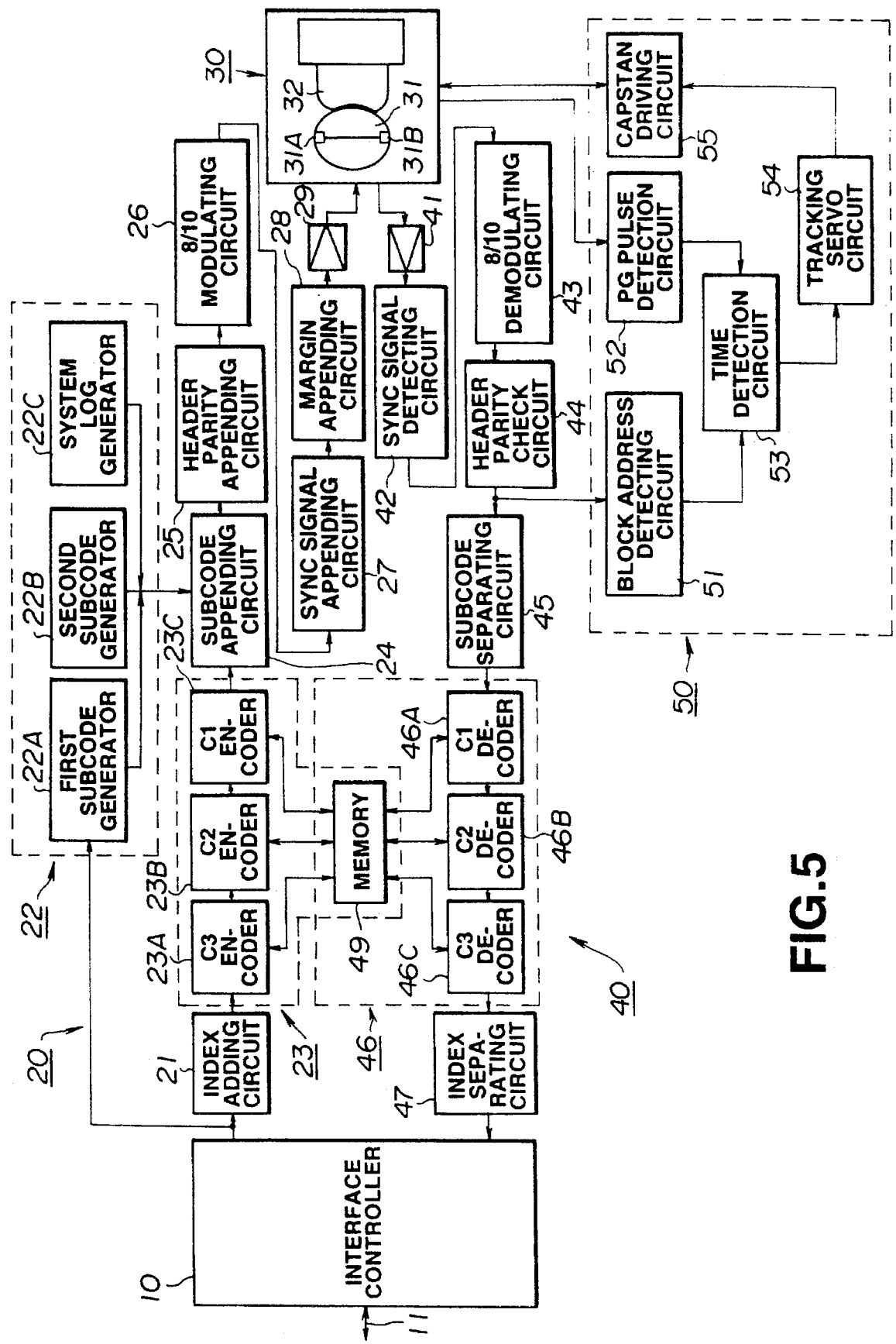
FIG. 5 is a block circuit diagram showing an arrangement of a data recording apparatus according to the present invention.

The data recording device according to the present invention is configured as shown, for example, in FIG. 5. The recording method of the present invention is carried out by the data recording apparatus.

The data recording device is a data streamer for recording and reproducing data on or from an azimuth track on a magnetic tape by a rotary magnetic head. The data recording device is made up of an interface controller 10 for exchanging data with the outside, a signal processing unit of the recording route 20 for processing input data supplied via the interface controller 10 for converting data into signals of a pre-set format, a recording/reproducing unit 30 for recording signals supplied from the signal processing unit 20 on the azimuth track on a magnetic tape 32 by a pair of rotary magnetic heads 31A, 31B or reproducing the signals recorded on the azimuth track by the rotary magnetic heads 31A, 31B, a signal processing unit of the reproducing route 40 for processing playback signals reproduced via the recording/reproducing unit 30 for reproducing the original data, and a tracking control unit 50 for controlling the tape running system of the recording/reproducing unit 30.

Figure 6:
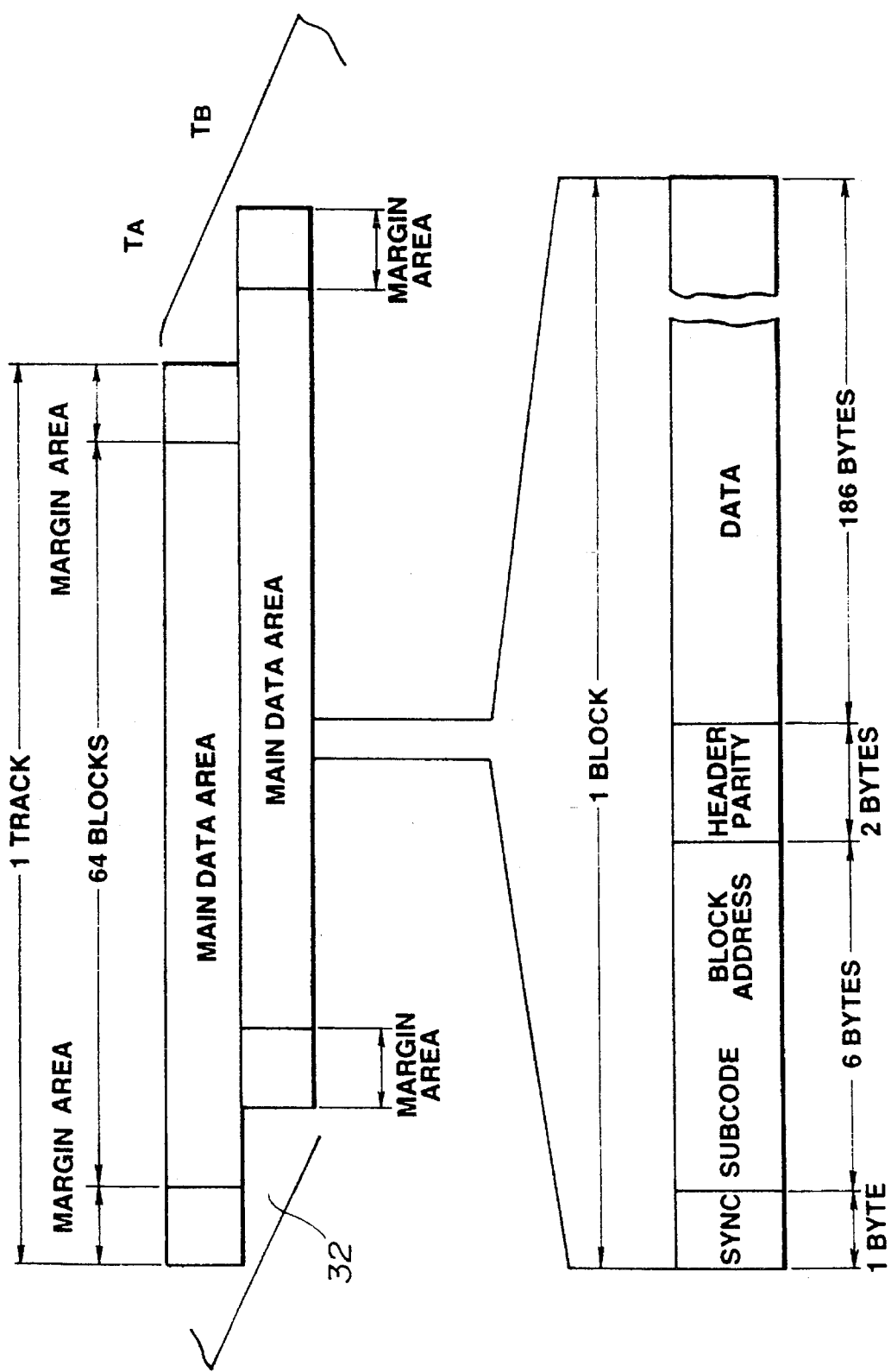
FIG. 6 is a diagrammatic view showing the track format of a magnetic tape for recording data by the data recording device.

With the present data recording apparatus, the recording/reproducing unit 30 has a rotary drum 31 on which a pair of the rotary magnetic heads 31A, 31B are mounted at an angle of 180° from each other. The magnetic tape 32 is placed around the rotary drum 31 over an extent of approximately 90° and run in this condition at a predetermined running velocity. Each time the rotary drum 31 completes one complete revolution, two azimuth tracks $T_A$, $T_B$ on the magnetic tape 32 are scanned by the rotary magnetic heads 31A, 31B for recording/reproducing the signals on or from the azimuth tracks, as shown in FIG. 6.

With the present data recording apparatus, each track is divided into three areas, namely a main data area and a pair of margin areas on both sides of the main data area. The main data area is divided into 64 blocks, each consisting of 195 bytes. Each block is divided into four domains, that is, a 1-byte first domain for recording synchronization signals, a 6-byte second domain for recording the sub-code and a block address, a 2-byte third domain for recording the header parity and a 186-byte fourth domain for recording main data. The main data is recorded in each block of the main data area along with the sub-code and the block address.

Figure 7:
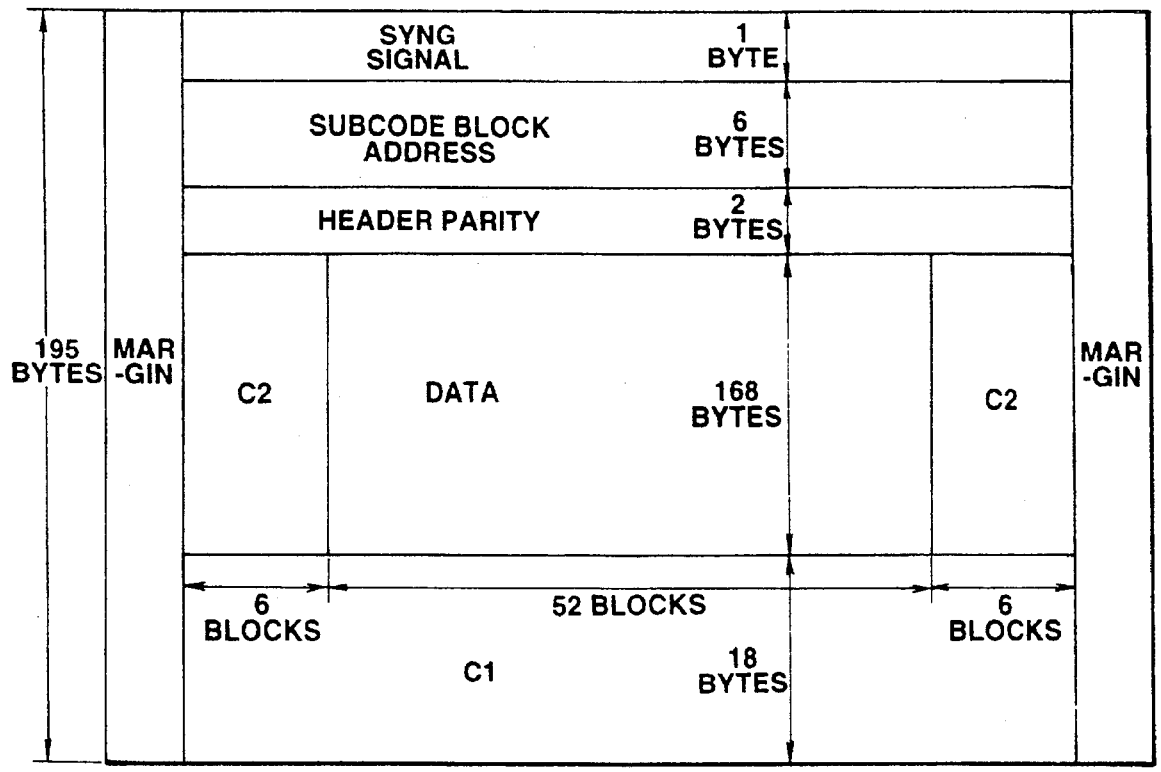
FIG. 7 is a diagrammatic view showing a data array for one track of data recorded on the magnetic tape by the data recording apparatus.

To the 186-byte data recorded in the fourth domain are appended two-dimensional error correction codes C2 and C1, as shown in FIG. 7. The error correction code C1 is recorded by being appended to the block-based main data, while the error correction code C2 is divided in two portions which are recorded at both terminal portions of the main data area of each track.

Figure 8:
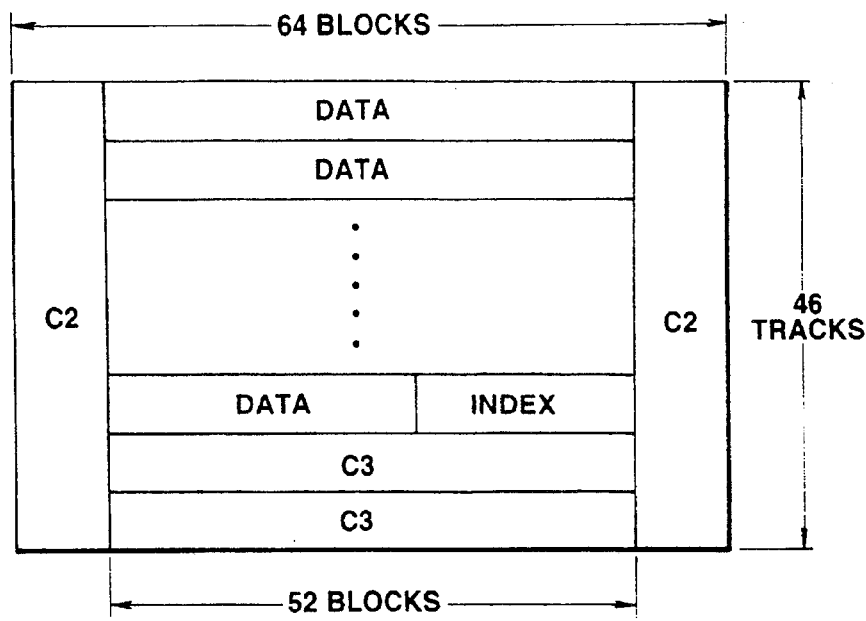
FIG. 8 is a diagrammatic view showing a data array for a data unit of 46 tracks recorded on the magnetic tape by the data recording apparatus.
Figure 9:
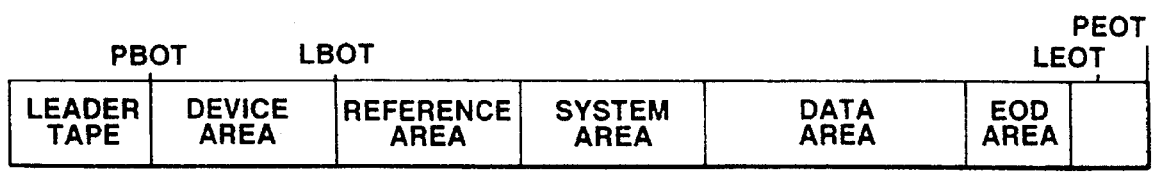
FIG. 9 is a diagrammatic view showing the tape format of a magnetic tape for recording data by the data recording apparatus.

The present data recording device employs an error correction coding system in which 46 tracks or 23 frames are grouped as a unit, with each frame being formed by two tracks; that is, 128 blocks. Referring to FIG. 8, the two portions of the error correction code C2, associated with a data string along the track direction, are arrayed on both ends of the main data area, while an error correction code C3, associated with a data string along the direction normal to the track direction, is recorded in two final tracks of the 46 tracks. For each of the above groups, the index information is appended for demarcating one set of the data from another.

As the sub-code, there are recorded a separator count indicating the demarcation between main data sets, a record count indicating the number of records, an area ID indicating respective areas defined by the tape format, frame numbers indicating the absolute position of the recording unit, a group count indicating the number of recording units, and a check sum.

Figure 10:
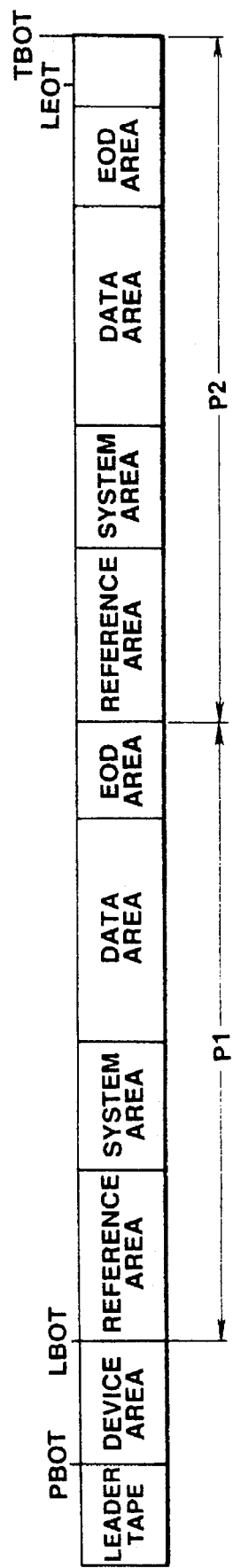
FIG. 10 is a diagrammatic view showing the tape format of a two-partition tape of the magnetic tape.

Like to the above-mentioned DDS Or DDS2 formats, the tape format of the present digital recording device provides a device area from the physical beginning of tape (PBOT) and logical beginning of tape (LBOT) in the leading region consecutive to the leader tape as areas for magnetic tape loading and unloading. The device area is followed by a reference area and a system area. The reference area is used as a physical reference when recording a system log (hysteresis information) in the system area. The system area is followed by the data area for recording main data, which in turn is followed by an end-of-data (EOD) area. The DDS2 format provides a two-partition tape having two partitions P1 and P2, each having the reference area, system area, data area and the EOD area, as shown in FIG. 10.

The system log (hysteresis information) for each of the partitions P1 and P2 is recorded in the system area of each of the partitions P1 and P2.

With the present data recording apparatus, the interface controller 10 exchanges data with an external host computer over a bus 11. That is, the interface controller 10 routes data from the host computer to the signal processing unit for the recording route 20, while transmitting data reproduced by the signal processing unit for the reproducing route 40 to the host computer.

Referring to FIG. 5, the signal processing unit for the recording route 20 has an index appending circuit 21, supplied with input data fed via the interface controller 10, a subcode generator 22 and an error correction code generator 23 fed with main data to which the index information has been appended by the index appending circuit 21. The signal processing unit 21 also has a subcode appending circuit 24 fed with the main data to which the error correction data has been appended by the error correction code generator 23 and with the subcode and the block address from the subcode generator, and a header parity appending circuit 25 fed with the main data to which the block address and the subcode have been appended by the subcode appending circuit 24. The signal processing unit 21 also has a 8/10 modulation circuit 26 fed with the main data to which the header parity has been appended by the header parity appending circuit 25, and a synchronization signal appending circuit 27 fed with the main data converted into 10-bit data by the 8/10 modulation circuit 26. Finally, the signal processing unit 21 also has a margin appending circuit 28 fed with the main data to which the synchronization signal has been appended by the synchronization signal appending circuit 27, and a recording amplifier 29 fed with the main data to which the margin has been appended by the margin appending circuit 28.

The index appending circuit 21 appends the index information to input data fed via the interface controller 10. The index information serves for demarcating data at an interval of the data unit of the 46 tracks or 23 frames.

The error correction code generator 23 has a memory 49, a C3 encoder 23A, a C2 encoder 23B and a C1 encoder 23C, as shown in FIG. 5.

In the error correction code generator 23, the memory 49 temporally stores the main data, to which the index information has been appended by the index appending circuit 21, on the data unit basis. The C3 encoder 23A generates, for the unit-based main data stored in the memory 49, the error correction code C3 for a data string in the direction normal to the track direction and allocates the error correction code C3 to the last two of the 46 tracks making up the data unit. The C2 encoder 23B generates the error correction code C2 for a data string in the track direction and divides the error correction code C2 in two portions which are allocated to both end portions of the main data area. In addition, the C1 encoder 23C generates the block-based error correction code C1.

The subcode appending circuit 24 appends the subcode and the block address, supplied from the subcode generator 22, to the main data to which the error correction codes C3, C2 and C1 have been appended by the error code generator 23. Thus the subcode and the block address are allocated to the second domain of the respective blocks.

The subcode generator 22 has first and second subcode generating circuits 22A, 22B and a system log generating circuit 22C, as shown in FIG. 5.

In the subcode generator 22, the first subcode generating circuit 22A generates a separator count, as the information indicating the demarcation between main data units, and the record count indicating the number of records, based on input data fed via the interface controller 10. The second subcode generator 22B generates area ID indicating respective areas defined on the tape format, frame numbers, group counts indicating the number of the record units or the check sum, along with the block addresses. The system log generating circuit 22C generates the system log (hysteresis information) for each of the partitions P1, P2 prescribed as the tape format.

The header parity appending circuit 25 generates 2-byte parity for error correction for the subcode and the block address appended to the main data by the subcode appending circuit 24, and appends the 2-byte parity data to the main data. Thus the 2-byte parity is allocated to the third domain of each block.

The 8/10 modulation circuit 26 converts the main data, to which the header parity and the block address have been appended by the header parity appending circuit 25, from 8 bits to 10 bits, on the byte basis, in order to maintain the dc level of the recorded signal at approximately zero.

The synchronization signal appending circuit 27 appends the synchronization signal to the main data, converted by the 8/10 modulation circuit 26 into 10-bit data, on the block basis. This allocates the synchronization signals to the first domain of each block.

The margin appending circuit 28 appends the margin to the main data, to which the synchronization signals have been appended by the synchronization signal appending circuit 27, on the track basis. This appends the margin area to each side of the main data area on the track basis.

The main data, to which the margin has been appended on the track basis by the margin appending circuit 28, is supplied by the recording amplifier 29 to the recording/reproducing unit 30.

With the present data recording apparatus, having the above-described signal processor for the recording route 20, each track is divided into the main data area and the margin areas on both sides of the main data area, while the main data area is divided into 64 blocks, each block being made up of 195 bytes. In addition, each block is divided into four domains, that is, a 1-byte first domain for recording a synchronization signal, a 6-byte second domain for recording the subcode and the block address, a 2-byte third domain for recording the header parity and a 186-byte fourth domain for recording main data. The subcode may be recorded along with the data in each block of the main data area. As the subcode, the separator count, as the demarcation information indicating the main data demarcation, the record count indicating the number of records, the area ID indicating respective areas defined on the tape format, the frame number, the group count indicating the number of records, or the check sum, may be recorded. Thus the track utilization efficiency may be improved by dividing each track into the main data area and both margin areas on both sides of the main data area and by recording the subcode along with the main-data in the main data area. In addition, the subcode may be improved in reliability by recording 2-byte parity for sub-code error detection in the third domain of each block. The result is a data recording medium having high track utilization efficiency.

In addition, with the present data recording apparatus, the two-dimensional error correction codes C2, C1 are generated for the 186-byte data recorded in the fourth domain, with the error correction code C1 being appended to the block-based main data and with the error correction code C2 being divided in two portions and recorded on both sides of the main data area. By recording the error correction code C1 on the block basis, the block-based main data may be improved in reliability. Furthermore, by dividing the error correction code C2 into two portions and recording them on both sides of the main data area on the track basis, the main data area may be separated from the tape portions corresponding to the start/end portions with the rotary head, thus reducing errors generated in the data of the main data area.

On the other hand, with the present data recording device, error correction coding is such that two tracks, that is, 128 blocks, make up a frame, and 46 tracks or 23 frames make up a unit or group. The error correction code C2 for the data string in the track direction is arrayed and recorded on both sides of the main data area, while the error correction code C3 for the data string in the direction normal to the track direction is allocated and recorded on the last two of the 46 tracks. The index information for data demarcation may be appended and recorded on the unit basis. By arraying the error correction code C2 for the data string in the track direction on both sides of the main data area, it becomes possible to render the main data less vulnerable to destruction, thus lowering the probability of error occurrence in the main data and allowing the correction errors in the main data reliably by the error correction code C3 for the data string in the direction normal to the track direction.

In addition, with the present data recording device, both the system logs (hysteresis information) of the partitions P1 and P2 are recorded as the subcode in the system area of the partition P1. By recording both system logs of the partitions P1 and P2 in the system area of the partition P1, it becomes possible to shorten the access time and to realize a data recording device having optimum operability.

The signal processing unit of the reproducing route 40 will now be explained. Referring to FIG. 5, the signal processing unit of the reproducing route 40 has a synchronization signal detection circuit 42, to which playback signals reproduced from the azimuth track of the magnetic tape 32 by the recording/reproducing unit 30 are fed via a playback amplifier 41, and an 8/10 demodulating circuit 43, to which the bi-level playback data is supplied from the synchronization signal detection circuit 42. The signal processing unit of the reproducing route 40 also has a subcode separating circuit 45 to which playback data converted into the 8-bit data is supplied from the 8/10 demodulating circuit 43 via the header parity check circuit 44. Finally, the signal processing unit of the reproducing route 40 has an error correction section 46 supplied with the playback data freed of the subcode by the subcode separating circuit 45 and an index separating circuit 47 fed with the playback data corrected for error by the error correction section 46.

In the signal processing unit of the reproducing route 40, the synchronization signal detection circuit 42 detects the synchronization signals from the playback signals supplied from the recording/reproducing unit 30 and converts the playback signals by clocks synchronized with the synchronization signals in order to generate playback data.

The 8/10 demodulation circuit 43, which is a counterpart device of the 8/10 modulation circuit 26 of the signal processing unit of the recording route 20, converts the 10-bit playback data supplied from the synchronization signal detection circuit 42 into 8-bit data by 8/10 demodulation.

The header parity check circuit 44 effects parity check of the subcode and the block address, using the 2-byte header parity. The subcode separating circuit 45 separates the correct subcode, parity-checked by the parity check circuit 44, from the playback data, and routes the separated subcode to, for example, a system controller, not shown.

The error correction section 46 has a memory 49, a C1 decoder 46A, a C2 decoder 48B and a C3 decoder 46C, as shown in FIG. 5.

In the error correction section 46, the memory 49 temporarily stores the main data, to which the index information has been appended, with the 46-track or 23-frame main data as a unit. The memory 47 is shared by the error correction code generator 23 of the signal processing unit of the recording route 20.

The C1 decoder 46A processes each unit of each block of the main data, stored in the memory 49, with error correction with the aid of the error correction code C1 appended on the block basis. The C2 decoder 46B processes each unit of the main data, error-corrected by the C1 decoder 46A, with error correction with the aid of the error correction code C2 appended to both ends of the main data area of each track. The error correction is performed on the data string arrayed in the track direction. The C3 decoder 46C processes each unit of the main data, error-corrected by the C2 decoder 46A, with error correction with the aid of the error correction code C3 appended to the last two of the 46 tracks making up each data unit. The error correction is performed on the data string arrayed in a direction normal to the track direction.

The index separating circuit 47 separates the index information from the unit-based main data, which has been corrected for errors by the error correction section 46, and transmits the separated index information to the system controller, not shown.

With the present data recording device, having the above-described signal processing unit of the reproducing route 40, the operation of error correction is carried out by the error correction section 46 using the block-based error correction code C1, track-based error correction code C1 and the unit-based error correction code C3, whereby the main data may be reliably corrected for errors to produce main data having extremely high reliability.

The tracking control unit 50 of the present data recording device will now be explained. The tracking control unit 50 has a block address detection circuit 51, supplied with the block address from the signal processing unit of the reproducing route 40 via the header parity check circuit 44, a PG detection circuit 52, supplied with the PG pulse from the recording/reproducing unit 30, and a time detection circuit 53 supplied with detection outputs of the block address detection circuit 51 and the PG detection circuit 52. The tracking control circuit 50 also has a tracking servo circuit 54 supplied with a detection output of the time detection circuit 59 and a capstan driving circuit 55 fed with an output of the tracking servo circuit 54.

Figure 11:
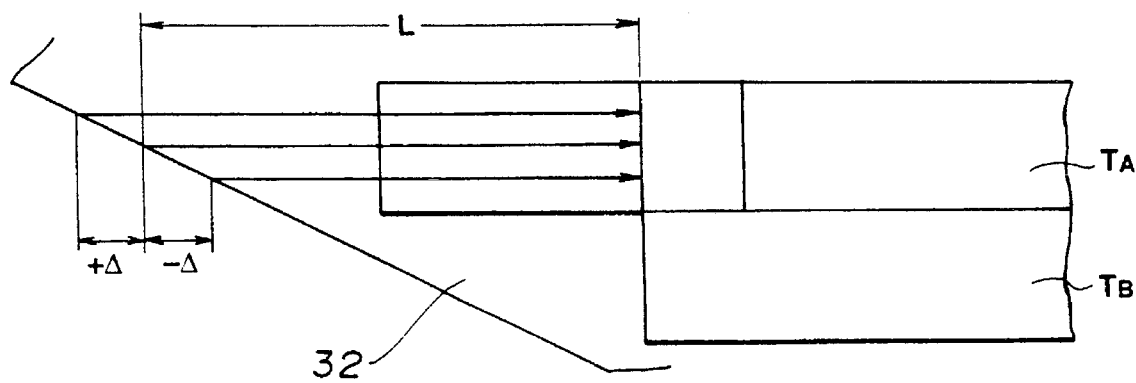
FIG. 11 is a schematic view for illustrating the principle of tracking error detection by the tracking control unit in the data recording apparatus.

With the tracking control unit 50, the block address detection circuit 51 detects the correct block address, parity-checked by the header parity check circuit 44, and routes a detection output indicating the detection timing to the time detection circuit 53. The PG detection circuit 52 detects the PG pulse, indicating the rotational phase of the rotary drum 31 supplied from the recording/reproducing unit 30, and routes a detection output indicating its detection timing to the time detection circuit 59. The time detection circuit 59 detects the time between the timing the block address detection circuit 51 has detected a predetermined block address and the timing the PG detection circuit 52 has detected the PG pulse. Supposing that the azimuth track on the magnetic tape 32 is scanned by the rotary magnetic heads 31A, 31B, the scanning distance from the tape edge of the track $T_A$ to a pre-set block, which is equal to L in the just-tracking state, is changed by $\pm\Delta$ depending on a tracking error, should there be any, as shown in FIG. 11. Thus the time detected by the time detection circuit 53 is changed from the time for the just-tracking state depending on the tracking error.

The tracking servo circuit 54 detects the time difference between the time detected by the time detection circuit 53 and the reference time, which is the time for the just-tracking state, and controls the capstan driving circuit 55, driving the capstan motor of the tape running system of the recording/reproducing unit 30, based upon the detection output, so that the tracking error will be reduced to zero.

With the present data recording apparatus, having the above-described tracking control unit 50, tracking control may be made without recording ATF signals for tracking control on the magnetic tape. Since there is no necessity of providing a domain for recording the ATF signals, the main data quantity may be correspondingly increased for further increasing the utilization efficiency of the magnetic tape.

What is claimed is:

1. A method for recording data on a plurality of azimuth tracks formed on a tape-shaped recording medium, comprising:

dividing each azimuth track into a main data area and a pair of margin areas on both sides of said main data area;

arraying main data recorded in said main data area of each azimuth track;

appending a first parity for error detection and correction to a data string arrayed in the track direction;

appending a second parity for error detection and correction to a data string arrayed in a direction normal to the track direction; and recording the first parity by a rotary head so that the first parity is arrayed on both sides of the main data area of each azimuth track.

2. The method as claimed in claim 1, further comprising dividing the main data corresponding to one track into a plurality of blocks, appending a third parity for error detection and correction for each block and recording the third parity in the main data area along with the main data.

3. A method for recording data on a plurality of azimuth tracks formed on a tape-shaped recording medium, comprising:

dividing each azimuth track into a main data area and a pair of margin areas on both sides of said main data area;

generating a first parity based upon a first data set of the main data recorded in said main data area in each azimuth track in a direction along said azimuth track;

recording the generated first parity so as to be appended at the front and rear sides of the main data area;

generating a second parity based upon a second data set of the main data recorded in said main data area in each azimuth track in a direction normal to said azimuth track;

appending the generated second parity to said main data to which the first parity has been appended; and recording the resulting data on the tape-shaped recording medium.

4. The method as claimed in claim 3, further comprising dividing the main data corresponding to one azimuth track into a plurality of blocks; appending a third parity for error detection and correction for each block; and recording the third parity in the main data area contiguous to the main data.

5. A tape-shaped recording medium for recording digital data, comprising:

a plurality of tracks each having a main data area and a pair of margin areas arrayed on both sides of the main data area, said recording medium storing the digital data comprised of main data;

a first parity generated on the basis of a first data set present in said main data in a direction along said tracks, the first parity being arrayed at the front and rear sides of the main data; and a second parity generated on the basis of a second data set present in the main data in a direction normal to said tracks arrayed at the front and rear sides of the main data, the second parity being arrayed at the rear side of the first data set present in the main data to which the first parity has been appended.

6. The tape-shaped recording medium as claimed in claim 5, wherein the main data corresponding to one track is divided into a plurality of blocks, a third parity for error detection and correction is generated for each block and the third parity is arrayed in the main data area contiguous to the trailing end of the main data.

7. A data recording apparatus for a tape-shaped recording medium in which data is recorded by a rotary head on a plurality of azimuth tracks formed on a tape-shaped recording medium, comprising:

an interface controller for external data exchange; and first and second parity generating means for appending a first parity and a second parity for error detection and correction to main data supplied via said interface controller, wherein each azimuth track is divided into a main area and a pair of margin areas on both sides of said main data area, main data recorded in said main data area of each azimuth track is arrayed two-dimensionally, the said first parity for error detection and correction from said first parity generating means is appended to a data string arrayed in the track direction, the second parity for error detection and correction from said second parity generating means is appended to a data string arrayed in a direction normal to the track direction, the first parity is arrayed on both sides of the main data area of each azimuth track and the resulting data is recorded by a rotary head on the tape-shaped recording medium.

8. The data recording apparatus as claimed in claim 7, further comprising third parity generating means for generating a third parity for error detection and correction for each block, the third parity from said third parity generating means being recorded along with the main data in said main data area.

9. A data recording apparatus for a tape-shaped recording medium having a plurality of azimuth tracks, comprising:

an interface controller for external data exchange;

first and second parity generating means for appending a first parity and a second parity for error detection and correction to main data supplied via said interface controller, said first parity generating means generating the first parity based upon a first data set present in main data recorded in a main data area of the tape-shaped recording medium in a direction along said tracks, each azimuth track of which is divided into the main data area and a pair of margin areas arrayed on both sides of said main data area, said second parity generating means generating the second parity based upon a second data set present in the main data recorded in the main data area in each azimuth track in a direction normal to said tracks; and recording means for recording the first parity generated by said first parity generating means so that the first parity is appended at the front and rear sides of said main data, said recording means recording the second parity generated by said second parity generating means so that the second parity is appended to the main data to which the first parity has been appended.

10. The data recording apparatus as claimed in claim 9, further comprising third parity generating means for generating a third parity for error detection and correction for each of a plurality of blocks into which a one-track portion of the main data is divided, the third parity from said third parity generating means being recorded by said recording means in said main data area along with the main data.

11. A data recording/reproducing apparatus for a tape-shaped recording medium having a plurality of azimuth tracks, comprising:

an interface controller for external data exchange;

first and second parity generating means for appending a first parity and a second parity for error detection and correction to main data supplied via said interface controller, said first parity generating means generating the first parity based upon a first data set present in main data recorded in a main data area of the tape-shaped recording medium in a direction along said tracks, each azimuth track of which is divided into the main data area and a pair of margin areas arrayed on both sides of said main data area, said second parity generating means generating the second parity based upon a second data set present in the main data recorded in the main data area in each azimuth track in a direction normal to said tracks;

recording/reproducing means for recording the first parity generated by said first parity generating means so that the first parity is appended at the front and rear sides of said main data, and for recording the second parity generated by said second parity generating means so that the second parity is appended to the main data to which the first parity has been appended, said recording/reproducing means reading out data recorded in the main data area of each azimuth track of the tape-shaped recording medium;

first decoding means for effecting error correction and detection based upon the first parity in the data read out by said recording/reproducing means; and second decoding means for effecting error correction and detection based upon the second parity in data decoded by said first decoding means, decoded data from said second decoding means being fed to said interface controller.

12. The data/recording reproducing apparatus as claimed in claim 11, further comprising third decoding means for effecting further error detection and correction based upon a third parity contained in the data read out by said recording/reproducing means, output data of said third decoding means being fed to said first decoding means.

13. A data reproducing apparatus for a tape-shaped recording medium on which digital data is recorded, said tape-shaped recording medium having a plurality of tracks each divided into a main data area and a pair of margin areas arrayed on both sides of the main data area, a first parity generated based upon a first data set present in main data recorded in said main data area of each track in a direction along said tracks, the first parity being arrayed at front and rear sides of the main data, and a second parity generated based upon a second data set present in the main data recorded in the main data area in each track in a direction normal to said tracks, the second parity being arrayed at the rear side of the main data to which the first parity has been appended, comprising:

reproducing means for reading out data recorded in the main data area of each track of the tape-shaped recording medium;

first decoding means for effecting error detection and correction based upon the first parity in data read out from said reproducing means;

second decoding means for effecting error detection and correction based upon the second parity in decoded data from said first decoding means; and an interface controller supplied with decoded data from said second decoding means.

14. The data reproducing apparatus as claimed in claim 13, further comprising third decoding means for effecting further error detection and correction based upon a third parity contained in the data read out from said reproducing means, output data of said third decoding means being fed to said first decoding means.

* * * * *